United States Patent
Butcher et al.

(10) Patent No.: US 10,545,882 B2
(45) Date of Patent: Jan. 28, 2020

(54) SYSTEMS AND METHODS FOR LOAD-BALANCING CACHE FLUSHES TO NON-VOLATILE MEMORY

(71) Applicant: Dell Products L.P., Round Rock, TX (US)

(72) Inventors: Wade Andrew Butcher, Cedar Park, TX (US); Vadhiraj Sankaranarayanan, Austin, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/882,728

(22) Filed: Jan. 29, 2018

(65) Prior Publication Data

US 2019/0236029 A1    Aug. 1, 2019

(51) Int. Cl.
*G06F 12/00* (2006.01)
*G06F 12/128* (2016.01)
*G06F 3/06* (2006.01)

(52) U.S. Cl.
CPC ............ *G06F 12/128* (2013.01); *G06F 3/065* (2013.01); *G06F 3/0608* (2013.01); *G06F 3/0632* (2013.01); *G06F 3/0653* (2013.01); *G06F 3/0679* (2013.01); *G06F 2212/621* (2013.01)

(58) Field of Classification Search
CPC .... G06F 12/128; G06F 3/0608; G06F 3/0632; G06F 3/065; G06F 3/0653; G06F 3/0679; G06F 2212/621
See application file for complete search history.

(56) References Cited

U.S. PATENT DOCUMENTS

| | | | |
|---|---|---|---|
| 6,594,701 B1* | 7/2003 | Forin | G06F 12/1081 709/232 |
| 2016/0253091 A1* | 9/2016 | Ayyavu | G06F 3/061 711/103 |
| 2018/0276124 A1* | 9/2018 | Chen | G06F 1/3287 |

OTHER PUBLICATIONS

Intel NVDIMM Block Window Driver Writer's Guide. Example NFIT-Based NVDIMM Block Window and Persistent Memory Interface Guide. Jul. 2016.*
Advanced Configuration and Power Interface Specification version 6.1 Jan. 2016.*

* cited by examiner

*Primary Examiner* — David Yi
*Assistant Examiner* — Tahilba O Puche
(74) *Attorney, Agent, or Firm* — Jackson Walker L.L.P.

(57) ABSTRACT

An information handling system may include a processor, a memory communicatively coupled to the processor and comprising a plurality of non-volatile memories, and a memory controller. The memory controller may be configured to monitor memory input/output traffic to each of the plurality of non-volatile memories, determine a quality of service associated with each of the plurality of non-volatile memories based on such monitoring, and based on such monitoring and the qualities of service associated with the plurality of non-volatile memories, reroute input/output data associated with a first non-volatile memory of the plurality of non-volatile memories to a second non-volatile memory of the plurality of non-volatile memories.

19 Claims, 2 Drawing Sheets

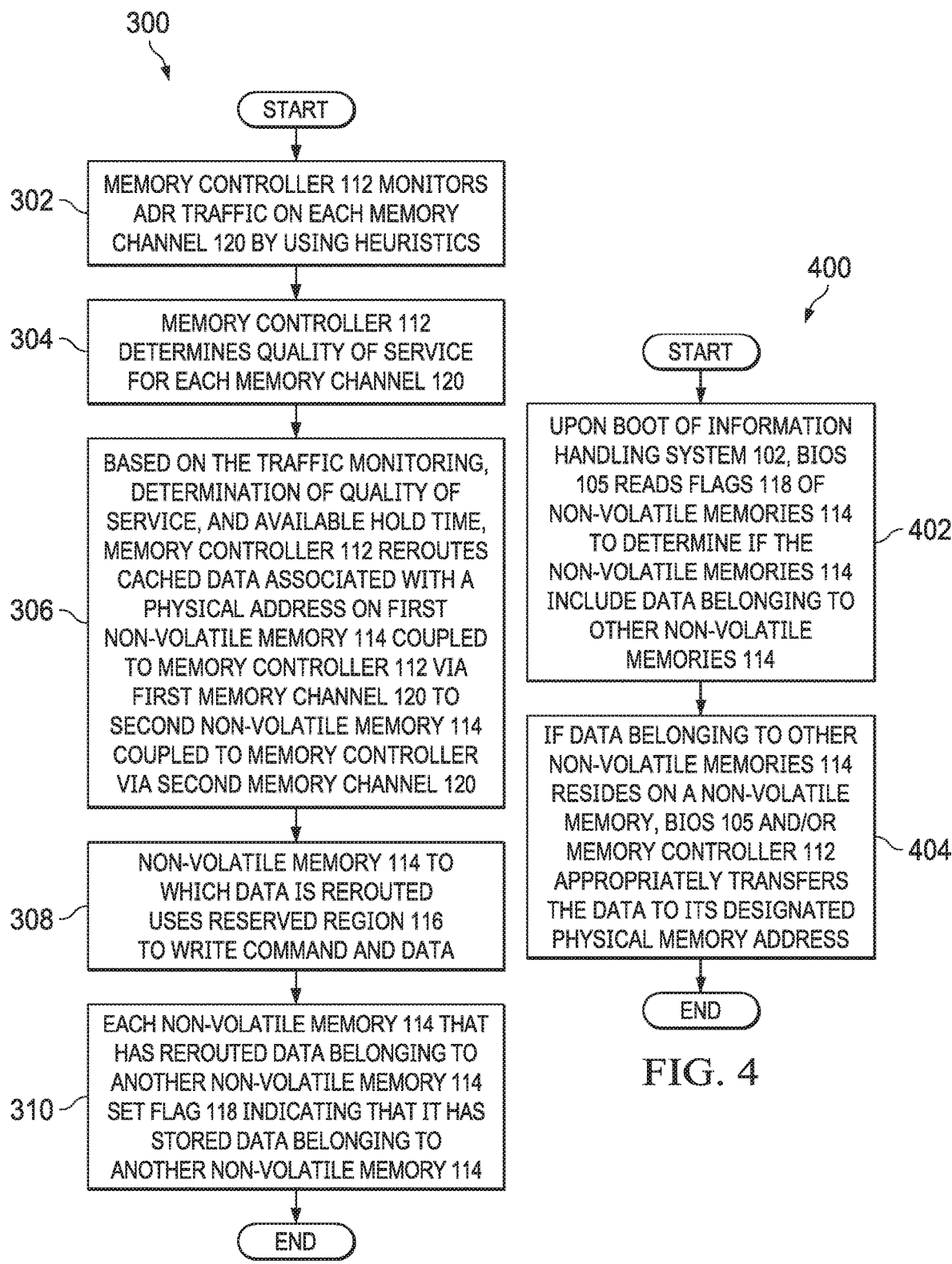

SYSTEMS AND METHODS FOR LOAD-BALANCING CACHE FLUSHES TO NON-VOLATILE MEMORY

TECHNICAL FIELD

The present disclosure relates in general to information handling systems, and more particularly to systems and methods for load-balancing cache flushes to non-volatile memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units (PSUs) for providing electrical energy to components of the information handling system. Typically, a power supply unit (PSU) is configured to operate from an input alternating current (AC) source of electrical energy, which the PSU converts to a direct current (DC) output. Thus, typically a PSU may include a rectifier and/or power factor correction stage to receive the input AC source and rectify the input AC waveform to charge a bulk capacitor to a desired voltage. A direct-current-to-direct-current (DC-DC) stage may convert the voltage on the bulk capacitor to a DC output voltage which may be used to power components of the information handling system. Other PSUs may be powered from a DC input source (e.g., a 48-volt DC input), and such PSUs may comprise a DC-DC converter for converting voltage to a desired level.

In traditional approaches, a PSU may be capable of, immediately after removal of the AC source to the PSU, providing electrical energy at its output for a period of time using the stored charge on the bulk capacitor to provide an output DC voltage. Such a period of time is limited, of course, as once the AC input is not available, the bulk capacitor will discharge and the PSU will shut down.

In response to an impending shutdown resulting from loss of AC input to a PSU, a write-back cache may attempt to flush data to a non-volatile memory, and the hold-up time of the bulk capacitor may provide sufficient time for the write-back cache to use available electrical energy from the PSU in order to complete the cache flush before the PSU ceases generating an output voltage as a result of the withdrawal of the input alternating-current waveform. It is noted that in some information handling systems, instead of an AC input source, a DC input source may be used. In such instances, similar hold-up time mechanisms may be provided.

Non-volatile memory is often implemented in memory modules called non-volatile dual-inline memory modules (NVDIMMs), and NVDIMMs may be any of the following types: NVDIMM-N, NVDIMM-F, or NVDIMM-P. These memories bring persistence to the memory channel and can be used in a variety of modes: as a volatile memory, as a load-store byte addressable memory, or as a block device. While NVDIMM-N is implemented using a volatile memory (e.g., dynamic random access memory or DRAM) upon which a save operation is performed in response to a power failure to transfer data of the volatile memory to non-volatile memory for later recovery, NVDIMM-F and NVDIMM-P devices are non-DRAM based true storage class memories (SCMs) as they offer larger capacities and can be used as storage devices residing on the memory channel.

DRAM-based NVDIMM-N devices have predictable read/write latencies. In other words, a host memory controller may orchestrate an entire sequence of events, as the controller knows when to send write data and when to receive read data. However, with NVDIMM-F and NVDIMM-P devices, reads and writes are non-deterministic in nature, as these modules may have an on-DIMM controller that assists in the data transfer to and from the media. The data transfer on the DIMM typically takes place between a front-end buffer and the media. The number of entries in the front-end buffer act as credits, and there is flow control between the host and the on-DIMM controller. The host decrements the available credit every time a write transaction is sent, and increments the credit when a response on completion of the write operation is received from the DIMM module. Similarly, for reads, the host controller maintains a number of available credits and associates every read command with a specific identifier. The NVDIMM then responds back with the read identifiers for which the data is available, and then the host acknowledges this and prepares for the read data transfer. Such a split-transaction protocol allows out-of-order completion of reads. One of the reasons for the out-of-order completion of reads is because of finite endurance levels of SCMs and the need for wear-leveling on the media regions subject to wear.

Deterministic latencies with NVDIMM-N modules render it fairly simple to estimate a worst-case time needed to flush out the cache-data during an asynchronous DRAM refresh (ADR) operation. An ADR operation may be triggered whenever an information handling system detects an impending power failure, thereby necessitating the flow of data meant for the NVDIMMs caches on a processor. With NVDIMM-N, due to the predictable latencies, it is conceivable to get the worst case scenario if all the cache data were targeted to one NVDIMM-N. However, it becomes a significantly complicated task with other NVDIMM types, not only due to their larger foot-print (e.g., size in gigabytes), but also their unpredictable (e.g., longer) latencies.

For example, the level 3 cache typically present in a server processor is several tens of megabytes in capacity, and the worst case would be if the entire data for the level 3 is mapped to a specific NVDIMM module. These deterministic latencies at least allow a system architect to calculate the amount of time needed to flush the cache data in the best and worst case scenarios, and decide on the power supply requirements as the power supply is withdrawn.

Thus, because the latencies are deterministic in nature, supporting an entire flush by a PSU for NVDIMM-N may be feasible.

However, such calculations and determination are not as simple with other NVDIMM types (NVDIMM-P and NVDIMM-F types), due to the non-deterministic latencies associated with these memories, as explained above. Providing power by taking the absolute worst case scenario (taking wear-leveling like latencies for every write) may not be feasible, because the read/write latencies are non-deterministic in nature, and to this there is an implicit flow-control between the memory controller and the DIMMs. Accordingly, more efficient system architectural approaches are necessary to address the cache data flush to SCM memory modules during cache flushing and ADR operation.

SUMMARY

In accordance with the teachings of the present disclosure, the disadvantages and problems associated with existing approaches to enabling cache flushing to persistent memory in an information handling system may be reduced or eliminated.

In accordance with embodiments of the present disclosure, an information handling system may include a processor, a memory communicatively coupled to the processor and comprising a plurality of non-volatile memories, and a memory controller. The memory controller may be configured to monitor memory input/output traffic to each of the plurality of non-volatile memories, determine a quality of service associated with each of the plurality of non-volatile memories based on such monitoring, and based on such monitoring and the qualities of service associated with the plurality of non-volatile memories, reroute input/output data associated with a first non-volatile memory of the plurality of non-volatile memories to a second non-volatile memory of the plurality of non-volatile memories.

In accordance with these and other embodiments of the present disclosure, a method may include monitoring memory input/output traffic to each of a plurality of non-volatile memories, determining a quality of service associated with each of the plurality of non-volatile memories based on such monitoring, and based on such monitoring and the qualities of service associated with the plurality of non-volatile memories, rerouting input/output data associated with a first non-volatile memory of the plurality of non-volatile memories to a second non-volatile memory of the plurality of non-volatile memories.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to monitor memory input/output traffic to each of a plurality of non-volatile memories, determine a quality of service associated with each of the plurality of non-volatile memories based on such monitoring, and based on such monitoring and the qualities of service associated with the plurality of non-volatile memories, reroute input/output data associated with a first non-volatile memory of the plurality of non-volatile memories to a second non-volatile memory of the plurality of non-volatile memories.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow chart of an example method for performing a cache flush to non-volatile memory with load-balancing, in accordance with embodiments of the present disclosure; and FIG. 4 illustrates a flow chart of an example method for performing recovery of data after a cache flush to non-volatile memory with load-balancing, in accordance with embodiments of the present disclosure.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
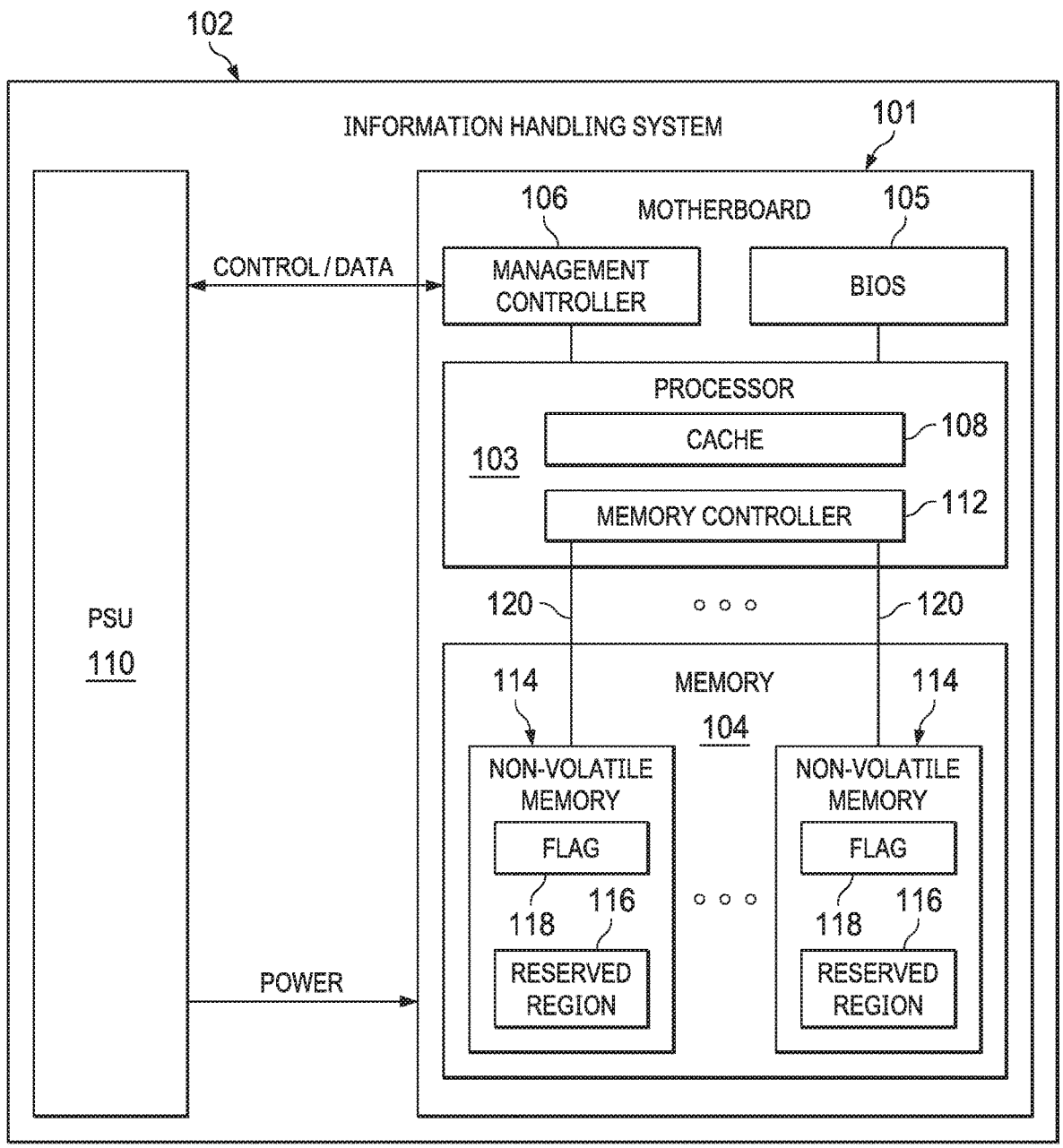
FIG. 1 illustrates a block diagram of an example information handling system, in accordance with embodiments of the present disclosure.

FIG. 1 illustrates a block diagram of an example of an information handling system 102, in accordance with embodiments of the present disclosure. As depicted, information handling system 102 may include a PSU 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. As shown in FIG. 1, processor 103 may include a cache 108 and a memory controller 112.

Cache 108 may comprise a memory used by processor 103 to reduce the average time to access data from main memory 104. Cache 108 may be a smaller, faster memory than memory 104 and may store copies of frequently-used data and instructions from memory 104. In some embodiments, cache 108 may comprise an independent data cache and instruction cache. In these and other embodiments, a cache may be organized in a hierarchy of multiple cache levels (e.g., level 1, level 2, level 3, etc.). In these and other embodiments, caches levels within the hierarchy may be inclusive or exclusive. All or part of cache 108 may be configured as a write-back cache, in which processor 103 writes may be stored in cache 108 without also writing the data to memory 104, until a subsequent action such as cache line invalidate or flush operation forces the data to be written back to memory 104. Thus in write-back cache, the most up-to-date copy of the data may only reside in cache 108 indefinitely. Some part of cache 108 may also be configured as a write-through cache, in which processor 103 writes are stored in cache 108 but also immediately to memory 104 such that the memory 104 has the most up-to-date copy of the data. In some embodiments, rather than configuring cache 108 itself, the cacheability of mutually-exclusive memory address ranges may be designated as write-back, write-through, or un-cacheable by having the BIOS 105 or an operating system mark the associated page tables for the address ranges of memory 104 accordingly during memory allocation. Reads from or writes to un-cacheable address ranges may not be stored in cache 108.

Memory controller 112 may be any system, device, or apparatus configured to manage and/or control memory 104. For example, memory controller 112 may be configured to read data from and/or write data to memory modules comprising memory 104. Additionally or alternatively, memory controller 112 may be configured to refresh memory modules and/or memory chips thereof in embodiments in which memory 104 (or a portion thereof) comprises DRAM. Although memory controller 112 is shown in FIG. 1 as an integral component of processor 103, memory controller 112 may be separate from processor 103 and/or may be an integral portion of another component of information handling system 102 (e.g., memory controller 112 may be integrated into memory 104).

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise one or more non-volatile memories 114 (e.g., comprising one or more non-volatile dual-inline memory modules). As shown in FIG. 1, each non-volatile memory 114 may be coupled to memory controller 112 via a respective memory channel 120. Also as shown in FIG. 1, each non-volatile memory 114 may also include a reserved region 116 and a flag 118.

As is described in greater detail below, a reserved region 116 may be a portion of a non-volatile memory 114 dedicated to storing flushed cache data associated with a physical memory address of another non-volatile memory 114 on another memory channel 120, wherein such storage of data may take place only during an ADR operation that occurs as a result of an impending power event. Also as described in greater detail below, a flag 118 may include any variable (e.g., a single bit) that indicates whether or not reserved region 116 includes stored flushed cache data associated with a physical memory address of another non-volatile memory 114 on another memory channel 120.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102. PSU 110 may convert external AC or DC input voltage supplied to information handling system 102 into one or more power rails required for operation of motherboard 101.

In addition to motherboard 101, processor 103, memory 104, BIOS 105, management controller 106, and PSU 110, information handling system 102 may include one or more other information handling resources. For example, in some embodiments, information handling system 102 may include more than one PSU 110.

In operation, memory controller 112 may monitor ADR traffic on each memory channel 120 by using heuristics, such as the flow-control credits available during ADR on each non-volatile memory 114 and the amount of incoming ADR cache traffic targeted to a specific memory channel 120. From such traffic monitoring, memory controller 112 may determine a quality of service for each memory channel 120. In addition, memory controller 112 may be aware of a hold time that information handling system 102 can support for allowing data within cache 108 to be flushed to memory 104 in response to a power event.

Figure 2:
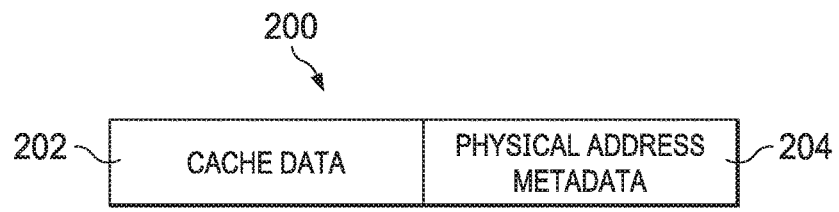
FIG. 2 illustrates an example entry associated with a rerouted data flush, in accordance with embodiments of the present disclosure.

Where, as in FIG. 1, there are multiple non-volatile memories 114/SCMs provisioned within memory controller 112, it may be advantageous to store data on faster media assuming there is unallocated space. Accordingly, based on the traffic monitoring, determination of quality of service, and available hold time, memory controller 112 may reroute cached data associated with a physical address on a first non-volatile memory 114 coupled to memory controller 112 via a first memory channel 120 with a large amount of traffic to a second non-volatile memory 114 coupled to memory controller 112 via a second memory channel 120 having a smaller amount of traffic, thus load balancing cache flushes. Memory controller 112 may undertake such rerouting by indicating that the rerouted data is a part of a special ADR write transaction, which may be performed as a special instruction at the transactional level (e.g., at a Joint Electron Device Engineering Council (JEDEC) NVDIMM-P level protocol). In response, the non-volatile memory 114 to which the data is rerouted may use its reserved region 116 to write both the command and the data, as the command and the data are for another non-volatile memory 114 residing in the same memory controller domain, and the command may in effect serve as metadata indicating a physical address for the data. FIG. 2 illustrates an example entry 200 in a reserved region 116 associated with a rerouted data flush, in accordance with embodiments of the present disclosure. As shown in FIG. 2, such entry may include the cache data 202 rerouted and physical address metadata 204 indicating a physical address for the data on another non-volatile memory 114.

Once the rerouted ADR operation completes, each non-volatile memory 114 that has rerouted data belonging to another non-volatile memory 114 may set flag 118, indicating that it has stored data belonging to another non-volatile memory.

Upon a subsequent reboot of information handling system 102, BIOS 105 may read flags 118 of the various non-volatile memories 114 to determine if the non-volatile memories 114 include data belonging to other non-volatile memories 114. If data belonging to other non-volatile memories 114 resides on a non-volatile memory 114, BIOS 105 and/or memory controller 112 will appropriately transfer the data to its designated physical memory address.

FIG. 3 illustrates a flow chart of an example method 300 for performing a cache flush to non-volatile memory with load-balancing, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, memory controller 112 may monitor ADR traffic on each memory channel 120 by using heuristics, such as the flow-control credits available during ADR on each non-volatile memory 114 and/or the amount of incoming ADR cache traffic targeted to a specific memory channel 120. At step 304, from such traffic monitoring, memory controller 112 may determine a quality of service for each memory channel 120. In addition, memory controller 112 may be aware of a hold time that information handling system 102 can support for allowing data within cache 108 to be flushed to memory 104 in response to a power event.

At step 306, based on the traffic monitoring, determination of quality of service, and available hold time, memory controller 112 may reroute cached data associated with a physical address on a first non-volatile memory 114 coupled to memory controller 112 via a first memory channel 120 with a large amount of traffic to a second non-volatile memory 114 coupled to memory controller 112 via a second memory channel 120 having a smaller amount of traffic, thus load balancing cache flushes. Memory controller 112 may undertake such rerouting by indicating that the rerouted data is a part of a special ADR write transaction, which may be performed as a special instruction at the transactional level (e.g., at a JEDEC NVDIMM-P level protocol).

At step 308, the non-volatile memory 114 to which the data is rerouted may use its reserved region 116 to write both the command and the data, as the command and the data are for another non-volatile memory 114 residing in the same memory controller domain, and the command may in effect serve as metadata indicating a physical address for the data.

At step 310, once the rerouted ADR operation completes, each non-volatile memory 114 that has rerouted data belonging to another non-volatile memory 114 may set flag 118, indicating that it has stored data belonging to another non-volatile memory.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

FIG. 4 illustrates a flow chart of an example method 400 for performing recovery of data after a cache flush to non-volatile memory with load-balancing. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, upon a boot of information handling system 102, BIOS 105 may read flags 118 of the various non-volatile memories 114 to determine if the non-volatile memories 114 include data belonging to other non-volatile memories 114.

At step 404, if data belonging to other non-volatile memories 114 resides on a non-volatile memory, BIOS 105 and/or memory controller 112 will appropriately transfer the data to its designated physical memory address.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Accordingly, in sum, the methods and systems described herein perform load-balancing at the memory controller level, thereby rerouting ADR data from more active non-volatile memories 114 to less active non-volatile memories. In addition, although the foregoing contemplates load-balancing performed at the memory controller level, in some embodiments, one or more memory controllers may operate to perform load-balancing that at the cache level (e.g., at a level 3 cache), so that rerouting of data can span between multiple memory controller domains.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a memory communicatively coupled to the processor and comprising a plurality of non-volatile memories; and
   a memory controller configured to:
      monitor memory input/output traffic to each of the plurality of non-volatile memories;
      determine a quality of service associated with each of the plurality of non-volatile memories based on such monitoring;
      receive an indication of an impending power failure event;
      based on the indication of the impending power failure event, trigger an asynchronous DRAM refresh (ADR) operation for the plurality of non-volatile memories; and
      based on such monitoring and the qualities of service associated with the plurality of non-volatile memories, reroute input/output data associated with the ADR operation and originally dispatched to a first non-volatile memory of the plurality of non-volatile memories to a second non-volatile memory of the plurality of non-volatile memories.

2. The information handling system of claim 1, wherein the memory controller is configured to monitor the memory input/output traffic and determine the qualities of service using heuristics including at least one of flow-control credits available during input/output operation on each of the plurality of non-volatile memories and an amount of cache traffic targeted to specific memory channels coupling the plurality of non-volatile memories to the memory controller.

3. The information handling system of claim 1, wherein the memory controller is integral to the processor.

4. The information handling system of claim 1, wherein the memory controller is configured to reroute input/output data associated with the first non-volatile memory to the second non-volatile memory by indicating that the rerouted input/out data is part of a special memory write transaction.

5. The information handling system of claim 1, wherein the second non-volatile memory is configured to write the rerouted input/output data to an entry of the second non-volatile memory and write metadata to the entry indicating a physical address of the first non-volatile memory to which the rerouted input/output data is to be stored upon a subsequent boot session of the information handling system.

6. The information handling system of claim 5, wherein the second non-volatile memory is further configured to set a variable indicating that it has stored data belonging to another non-volatile memory.

7. The information handling system of claim 1, wherein the processor is further configured to, upon a subsequent boot session of the information handling system, transfer the rerouted input/output data from the second non-volatile memory to the first non-volatile memory.

8. A method comprising:
monitoring memory input/output traffic to each of a plurality of non-volatile memories;
determining a quality of service associated with each of the plurality of non-volatile memories based on such monitoring;
receive an indication of an impending power failure event;
based on the indication of the impending power failure event, trigger an asynchronous DRAM refresh (ADR) operation for the plurality of non-volatile memories; and
based on such monitoring and the qualities of service associated with the plurality of non-volatile memories, rerouting input/output data associated with the ADR operation and originally dispatched to a first non-volatile memory of the plurality of non-volatile memories to a second non-volatile memory of the plurality of non-volatile memories.

9. The method of claim 8, wherein monitoring the memory input/output traffic and determining the qualities of service comprises using heuristics including at least one of flow-control credits available during input/output operation on each of the plurality of non-volatile memories and an amount of cache traffic targeted to specific memory channels coupling the plurality of non-volatile memories to a memory controller.

10. The method of claim 8, wherein rerouting input/output data associated with the first non-volatile memory to the second non-volatile memory comprises indicating that the rerouted input/out data is part of a special memory write transaction.

11. The method of claim 8, further comprising writing the rerouted input/output data to an entry of the second non-volatile memory and writing metadata to the entry indicating a physical address of the first non-volatile memory to which the rerouted input/output data is to be stored upon a subsequent boot session of an information handling system comprising the plurality of non-volatile memories.

12. The method of claim 11, further comprising setting a variable of the second non-volatile memory indicating that it has stored data belonging to another non-volatile memory.

13. The method of claim 8, further comprising, upon a subsequent boot session of an information handling system comprising the plurality of non-volatile memories, transferring the rerouted input/output data from the second non-volatile memory to the first non-volatile memory.

14. An article of manufacture comprising:
a non-transitory computer-readable medium; and
computer-executable instructions carried on the computer-readable medium, the instructions readable by a processor, the instructions, when read and executed, for causing the processor to:
monitor memory input/output traffic to each of a plurality of non-volatile memories;
determine a quality of service associated with each of the plurality of non-volatile memories based on such monitoring;
receive an indication of an impending power failure event;
based on the indication of the impending power failure event, trigger an asynchronous DRAM refresh (ADR) operation for the plurality of non-volatile memories; and
based on such monitoring and the qualities of service associated with the plurality of non-volatile memories, reroute input/output data associated with the ADR operation and originally dispatched to a first non-volatile memory of the plurality of non-volatile memories to a second non-volatile memory of the plurality of non-volatile memories.

15. The article of claim 14, wherein monitoring the memory input/output traffic and determining the qualities of service comprises using heuristics including at least one of flow-control credits available during input/output operation on each of the plurality of non-volatile memories and an amount of cache traffic targeted to specific memory channels coupling the plurality of non-volatile memories to a memory controller.

16. The article of claim 14, wherein rerouting input/output data associated with the first non-volatile memory to the second non-volatile memory comprises indicating that the rerouted input/out data is part of a special memory write transaction.

17. The article of claim 14, the instructions for further causing the processor to write the rerouted input/output data to an entry of the second non-volatile memory and write metadata to the entry indicating a physical address of the first non-volatile memory to which the rerouted input/output data is to be stored upon a subsequent boot session.

18. The article of claim 17, the instructions for further causing the processor to set a variable of the second non-volatile memory indicating that it has stored data belonging to another non-volatile memory.

19. The article of claim 14, the instructions for further causing the processor to, upon a subsequent boot session, transfer the rerouted input/output data from the second non-volatile memory to the first non-volatile memory.

* * * * *